(12) United States Patent
Chu

(10) Patent No.: US 12,143,473 B2
(45) Date of Patent: Nov. 12, 2024

(54) SECURITY ASSURANCE FOR CYBER SUPPLY CHAINS

(71) Applicant: C2SEC INC, Redmond, WA (US)

(72) Inventor: Chengyun Chu, Redmond, WA (US)

(73) Assignee: C2SEC Inc, Redmond, WA (US)

( * ) Notice: Subject to any disclaimer, the term of this patent is extended or adjusted under 35 U.S.C. 154(b) by 273 days.

(21) Appl. No.: 17/841,506

(22) Filed: Jun. 15, 2022

(65) Prior Publication Data

US 2022/0407687 A1 Dec. 22, 2022

Related U.S. Application Data

(60) Provisional application No. 63/211,757, filed on Jun. 17, 2021.

(51) Int. Cl.
| | | |
|---|---|---|
| *H04L 29/06* | (2006.01) | |
| *H04L 9/08* | (2006.01) | |
| *H04L 9/32* | (2006.01) | |

(52) U.S. Cl.
CPC .......... *H04L 9/0825* (2013.01); *H04L 9/3226* (2013.01); *H04L 9/3236* (2013.01)

(58) Field of Classification Search
CPC ....... H04L 63/08; H04L 63/123; H04L 63/10; H04L 9/3226; H04L 9/3247; H04L 9/0825; H04L 63/0428; H04L 9/3236; H04L 63/20; H04L 9/3239
See application file for complete search history.

(56) References Cited

U.S. PATENT DOCUMENTS

| | | |
|---|---|---|
| 2019/0303579 A1 | 10/2019 | Reddy et al. |
| 2020/0236009 A1 | 7/2020 | Meyer et al. |
| 2021/0029151 A1 | 1/2021 | Brooks |

FOREIGN PATENT DOCUMENTS

| | | | | |
|---|---|---|---|---|
| CA | 2975441 A1 | * | 8/2016 | ......... G06F 21/6218 |
| EP | 2537285 B1 | * | 9/2018 | ......... H04L 63/0428 |

OTHER PUBLICATIONS

International Search Report and Written Opinion, mailed Oct. 26, 2022, for International Application No. PCT/US22/33639, 14 pages.

* cited by examiner

*Primary Examiner* — Tri M Tran
(74) *Attorney, Agent, or Firm* — Seed Intellectual Property Law Group LLP

(57) ABSTRACT

This disclosure relates to security assurance of cyber supply chains. An example method includes a downstream party obtaining information regarding a policy of an upstream party to be applied to data of the downstream party, and the downstream party generating credential criteria for trusted access to the data based on a representation of the policy. The example method also includes the downstream party providing to a security assurance facilitator the data in a form accessible in accordance with the credential criteria, and the downstream party obtaining a result from trusted computation implemented by the security assurance facilitator that applies the policy to the data.

22 Claims, 8 Drawing Sheets

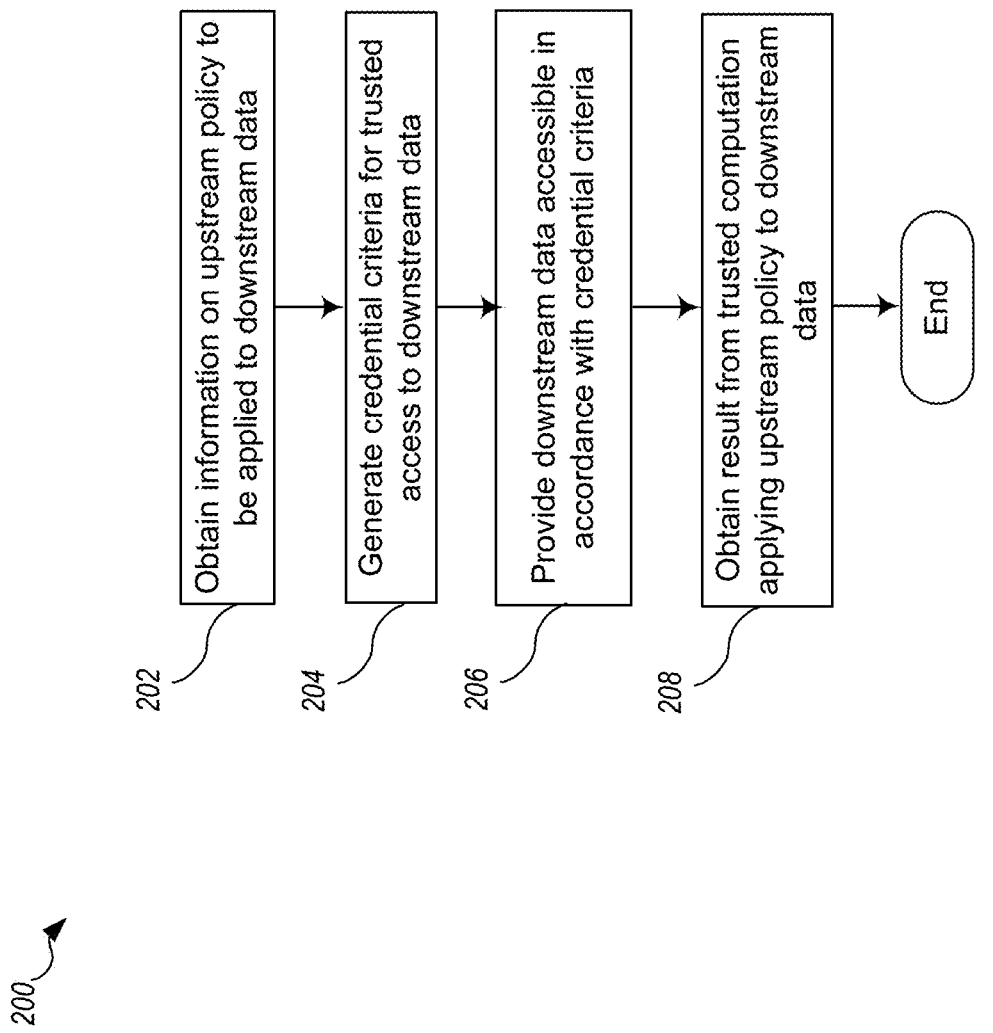

SECURITY ASSURANCE FOR CYBER SUPPLY CHAINS

BACKGROUND

Contemporary enterprises run complex information systems and networks to support their missions. These information systems and networks can be made available by suppliers, developers, and system integrators, which create various dependencies among them to form a cyber (or digital) supply chain. In accordance with the cyber supply chain, enterprises can acquire and deploy an array of products and services, including custom software for information systems built to be deployed within the enterprise, made available by developers; operations, maintenance, and disposal support for information systems and networks within and outside of the enterprise's boundaries made available by system integrators or other related service providers; and external services to support the enterprise's operations that are positioned both inside and outside of the authorization boundaries, made available by external system service providers.

The responsibility and accountability for the services and associated activities performed by different parties within the cyber supply chain are usually defined by agreement documents between the enterprise and suppliers, developers, system integrators, external system service providers, and other related service providers.

With the proliferation of ubiquitous computational technologies such as cloud computing and software as a service (SaaS), it is difficult for data owners, controllers, and/or facilitators (e.g., a data processing application, a SaaS data analysis service, a cloud data storage, or the like) in a cyber supply chain to track or otherwise be informed of where data moves and whether data is secure, once the data interacts with other parties. In addition, in many cases, nothing prevents the other parties from then subcontracting again or using other SaaS or platform as a service (PaaS) providers that provide no visibility to the original owner, controller, or facilitator.

Cyber supply chain dependencies, including data sub-processing dependency, software dependency, infrastructure dependency, service dependency, or the like, have raised critical security concerns that need technological solutions.

BRIEF DESCRIPTION OF THE DRAWINGS

FIG. 2 is a flow diagram depicting an example process for trusted data sharing in accordance with some embodiments of the techniques described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

Figure 5:
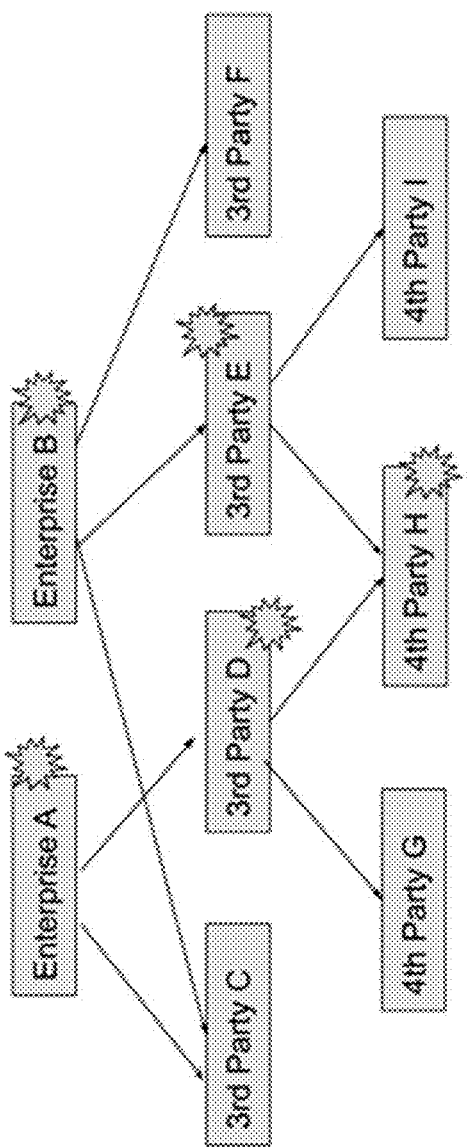
FIG. 5 is a diagram illustrating an example security risk associated with a cyber supply chain.

FIG. 5 is a diagram illustrating an example security risk associated with a cyber supply chain. As shown, in the cyber supply chain, Enterprise A uses third party vendors C and D, and Enterprise B uses third party vendors C, E, and F. Third party vendor D further uses fourth party vendors G and H, while third party vendor E further uses fourth party vendors H and I.

A security vulnerability exists with fourth party H, and this vulnerability causes a cyber incident to occur in H. Because parties D and E are using H, their data are also breached. And because parties D and E are breached, enterprises A and B are breached as well.

To prevent or address security issues as illustrated above or otherwise caused by the dependencies of cyber supply chain, many enterprises are faced with significant challenges. For example:

Where do risks come from? For example, how could a security mechanism in Enterprise A determine that it has cyber dependencies with C and D? How could the security mechanism in Enterprise A determine that it has a cyber dependency with H because D uses H?

How to control the risks? Even assuming the security mechanism has knowledge of the dependencies with D, and H, how could it assure the security of D, and further how could it assure the security of H, which Enterprise A only has an indirect relationship with.

What will be the impact of the risks? If a cyber incident happens in H, how could security mechanisms evaluate its impact and know which parties might be affected?

Typical solutions have some serious constraints and may not resolve these issues. For example:

Typical Solution 1—manual questionnaire based assessment. Enterprises send their vendors a questionnaire or checklist about their security controls. In many cases, this approach can only be used to meet formality compliance requirements.

Typical Solution 2—cyber security rating service. A security rating service may use non-intrusive external security data to evaluate the vendors' security and give each vendor a score or rating. While this can be an improvement when compared to solution 1 in certain cases, the effectiveness of its security rating is limited, e.g., due to the lack of internal data from the vendors.

Typical Solution 3—cyber risk exchange service. This type of service may provide a way for vendors to share their assessment results with multiple organizations. The results can be based on questionnaire(s), rating service(s), or both.

These typical solutions cannot or are unlikely to ensure the operation security in real-time, as the data they operate on is limited, and they lack enforcement across the entire supply chain. Meanwhile, due to the lack of trust among different parties, the type and scope of data exchanged can also be very limited. Therefore, typical solutions cannot solve the issues described above in an efficient or effective manner.

In a complex cyber supply chain, each individual company or other organization cannot just rely on its own data to assure data security, because data, infrastructure, and service depend on each other in the chain. To ensure trust and determine complete supply chain dependencies, the presently disclosed technology includes a solution framework that can:

enable different organizations in the supply chain to aggregate sensitive operation data together with trust;
enable the aggregated data to be analyzed and audited based on requirement of different parties in the supply chain, while preserving the confidentiality of data; and
enable the analysis results to be fed back to the different parties in the supply chain.

All these functionalities can be performed in a real-time, continuous, and automated manner. Illustratively, the solution can include a security assurance facilitator, e.g., implemented as a platform that enables:

1. upstream parties to trust the platform and provide their internal details of usage and configuration of downstream services;
2. downstream parties to trust the platform and provide their sensitive operation data (e.g., internal cloud configurations, API logs, or the like), as well as their own third-party usage and configurations;
3. upstream parties to run analysis based on data provided by downstream parties to ensure their data is secure in the downstream parties; and
4. as the graph of supply chain becomes more complex, the upstream parties to ensure their operation security across all downstream parties (e.g., via their computing nodes) in the supply chain.

In a cyber supply chain, an upstream party typically is a user of a service and a downstream party typically is a provider of the service. In various embodiments, a downstream party providing some type(s) of service may also be an upstream party using other type(s) of service. Trust and security are essential to the platform, because typically no entity wishes to expose its internal data (e.g., internal cloud configuration) to any other entity (including its upstream parties and the platform owner). Therefore, in accordance with some embodiments of the presently disclosed technology, the upstream can implement analysis through the platform and receive results without having direct access to downstream's internal operation data.

In some embodiments, the technology disclosed herein is implemented in a system that is configured to perform actions including: obtaining, by a downstream party of a cyber supply chain, information regarding a policy of an upstream party of the cyber supply chain, the policy to be applied to first data of the downstream party; generating, by the downstream party, credential criteria for trusted access to the first data based, at least in part, on a representation of the policy; providing, by the downstream party to a security assurance facilitator for the cyber supply chain, the first data in a form accessible in accordance with the credential criteria; and obtaining, by the downstream party, a result from trusted computation implemented by the security assurance facilitator that applies the policy to the first data.

In some embodiments, in accordance with the cyber supply chain, the upstream party uses a service provided by the downstream party and the first data includes operation data of the service. In some embodiments, the information regarding the policy of the upstream party includes at least one of a programing language description, plain English description, or human-readable data-serialization language description.

In some embodiments, the representation of the policy includes a hash of the policy. In some embodiments, the credential criteria include allowing trusted access to the first data when presented with a credential including the hash of the policy. In some embodiments, the credential criteria further includes allowing trusted access to the first data when presented with a credential including an identification of the upstream party.

In some embodiments, providing, by the downstream party to the security assurance facilitator for the cyber supply chain, the first data in a form accessible in accordance with the credential criteria includes providing the first data in an encrypted form. In some embodiments, the first data is decrypt-able using a key that is accessible in accordance with the credential criteria.

In some embodiments, the actions further include: obtaining, by the downstream party, information regarding another policy of another upstream party of the cyber supply chain, the other policy to be applied to second data of the downstream party; and generating, by the downstream party, other credential criteria for trusted access to the second data based, at least in part, on a representation of the other policy. In some embodiments, the actions further include: providing, by the downstream party to the security assurance facilitator for the cyber supply chain, the second data in a form accessible in accordance with the other credential criteria; and obtaining, by the downstream party, the result from trusted computation implemented by the security assurance facilitator that also applies the other policy to the second data.

The technology described herein enables a platform to provide functions for continuous monitoring, auditing and ensuring data or operation security in the entire cyber supply chain. For example, via an analysis module, which includes functionalities based on agreement by multiple parties in the supply chain, the platform can perform the analysis on the aggregate sensitive data provided by multiple parties while preserving confidentiality of each party's data.

The technology described herein not only can provide unique insights for enterprises to avoid, minimize, or mitigate their third party risks at the early stage, but can also give enterprises the capability to evaluate damages (if any) more accurately and respond to exposed vulnerability (if any) more quickly, with the kind of data visibility never achieved before. With the graph and data of the chained parties that the platform builds, risk management can quickly (e.g., sometimes in real-time) determine which entity in the chain will be or is likely to be impacted and help remedy or mitigate the vulnerability along the chain accurately and promptly.

Figure 1:
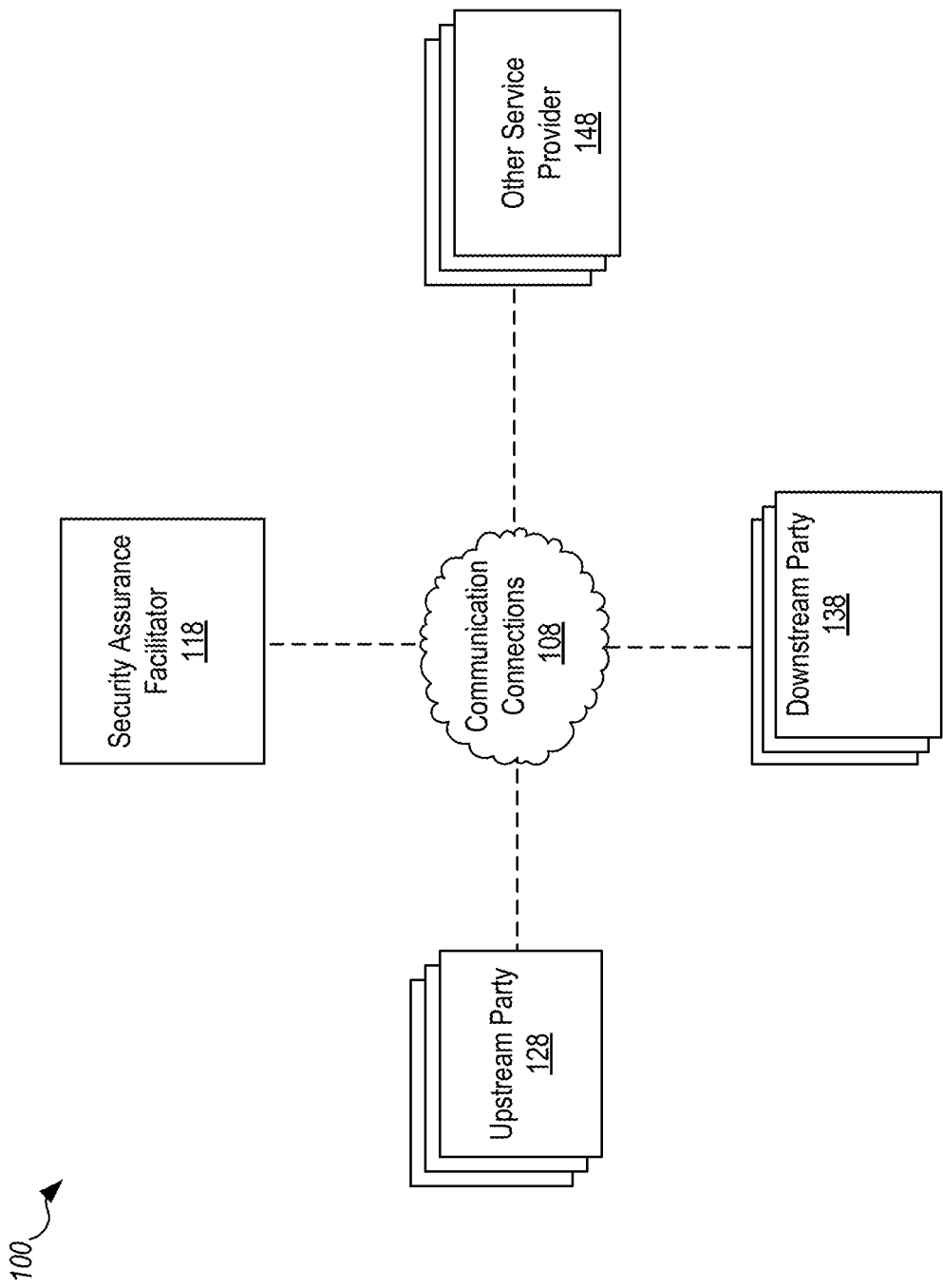
FIG. 1 is a block diagram illustrating an example networked environment for facilitating security assurance of cyber supply chain in accordance with some embodiments of the techniques described herein.

FIG. 1 is a block diagram illustrating an example networked environment 100 for facilitating security assurance of cyber supply chain in accordance with some embodiments of the techniques described herein. The networked environment 100 includes a security assurance facilitator 118, one or more upstream parties 128 of a cyber supply chain, one or more downstream parties 138 of the cyber supply chain, and in some embodiments, one or more other service providers 148, which are communicatively connected to one another via at least some part of communication connections 108.

In the depicted networked environment 100, the communication connections 108 may comprise one or more computer networks, one or more wired or wireless networks, satellite transmission media, one or more cellular networks, or some combination thereof. The communication connections 108 may include a publicly accessible network of linked networks, possibly operated by various distinct parties, such as the Internet. The communication connections 108 may include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the communication connections 108 may include various types of wired and/or wireless networks in various situations, including satellite transmission. In addition, the communication connections 108 may include one or more communication interfaces to individual entities in the networked environment 100, various other mobile devices, computing devices and media devices, including but not limited to, radio frequency (RF) transceivers, cellular communication interfaces and antennas (e.g., CBRS nodes or other cellular nodes), USB interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like.

In various embodiments, the security assurance facilitator 118 can include one or more computing devices for performing the cyber supply chain security assurance facilitation functions described herein. In some embodiments, the security assurance facilitator 118 is partially implemented within one or more upstream parties 128, downstream parties 138, or other service providers 148. In some embodiments, the security assurance facilitator 118 can implement one or more trusted execution environments (TEEs). As an example, a TEE can be a secure area of a main processor. It guarantees code and data loaded inside to be protected with respect to confidentiality and integrity. A TEE as an isolated execution environment provides security features such as isolated execution, integrity of applications executing with the TEE, along with confidentiality of their assets.

In various embodiments, individual upstream parties 128, downstream parties 138, or other service providers 148 can be implemented in software and/or hardware form on one or more computing devices including a "computer," "mobile device," "tablet computer," "smart phone," "handheld computer," "server," and/or "workstation," etc. The other service provider(s) 148 can provide business, operation, marketing, pricing, or other information related to the cyber supply chain without any dependency that integrates them into the chain.

Data communications among entities of the networked environment 100 can be encrypted. Related encryption and decryption may be performed as applicable according to one or more of any number of currently available or subsequently developed encryption methods, processes, standards, protocols, and/or algorithms, including but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the exemplary networked environment 100 and the various service providers, systems, networks, and devices therein is intended as a broad, non-limiting overview of an exemplary environment in which various embodiments of the facility may be implemented. FIG. 1 illustrates just one example of an operating environment, and the various embodiments discussed herein are not limited to such environments. In particular, the networked environment 100 may contain other devices, systems and/or media not specifically described herein.

FIG. 2 is a flow diagram depicting an example process 200 for trusted data sharing in accordance with some embodiments of the techniques described herein. In various embodiments, at least some part of the process 200 is performed in real time; and at least some part of the process 200 can be implemented by a downstream party 138, upstream party 128, or security assurance facilitator 118 of FIG. 1.

The process 200 starts at block 202, which includes obtaining, by a downstream party, information regarding a policy of an upstream party that is to be applied to target data of the downstream party. Illustratively, the downstream party can receive this information via one or more communicative connections internal to or external to the cyber supply chain. In some embodiments, the upstream party uses a service (e.g., software, software component, physical or virtual network, data management or storage, combination or the same or the like) provided by the downstream party, and the target data includes operation data (e.g., the downstream party's internal cloud configurations, API logs, third-party usage and configurations, combination of the same or the like) of the service.

The information regarding the policy of the upstream party can take various forms, such as including a programing language description, plain English description, or human-readable data-serialization language description of the policy. Illustratively, the policy information can include a policy defined in YAML format. An example can be:

```
Policy #1: Login must enable SSO
name: Single Sign-On
title: SaaS login should implement single sign-on using industry
  standard protocols
posture_type: application
sub_type: loginentry
property:
  sso-enabled: true
audit:
  severity: high
  action: report
```

At block 204, the process 200 includes generating, by the downstream party, credential criteria for trusted access to the target data based, at least in part, on a representation of the policy. To ensure that the target data is only used for the purpose specified in the policy, access to the target data needs to be controlled in a way that's associated with the nature and uniqueness of the policy. Therefore, the representation of the policy typically has a one-on-one mapping or similar relationship with the policy itself.

For example, the representation of the policy can include a hash of the policy (e.g., based on its YAML format) or of an information package including the policy. The credential criteria can include allowing trusted access to the target data when presented with a credential including the hash. In some embodiments, the credential criteria include further restrictions, e.g., allowing trusted access to the target data when further presented with a credential including an identification of the upstream party.

Illustratively, the hash is included to ensure that only the policy agreed, approved, or otherwise pre-arranged between the upstream and downsteam parties can be applied to the sensitive data provided from the downstream. Alternatively or in addition, the representation of the policy can include a copy or version of the policy that is digitally signed by a key pre-approved or otherwise verifiable by the relevant upstream and downstream parties.

At block 206, the process 200 includes providing, by the downstream party to a security assurance facilitator, the target data in a form accessible in accordance with the credential criteria. In some embodiments, the security assurance facilitator creates or maintains one or more TEEs for the cyber supply chain, via applicable confidential computing technology (e.g., Azure Confidential Computing technology). The downstream party can send the target data or its retrieval mechanism (e.g., a data link, pointer, or others) in an encrypted form to an applicable TEE, where the target data (or its retrieval mechanism) is only decrypt-able using a key that is accessible in accordance with the credential criteria.

At block 208, the process 200 includes obtaining, by the downstream party, a result from trusted computation implemented by the security assurance facilitator that applies the policy to the target data. As described above, different downstream parties in the supply chain can provide their data for trusted aggregation, analysis, or auditing based on requirement (e.g., policy) of different upstream parties, while preserving the confidentiality of their data. The result from such trusted computation can be fed back to the different downstream or upstream parties accordingly.

In some embodiments, the downstream party obtains information regarding another policy of another upstream party, the other policy can be applied to the same or different target data of the downstream party. An example of the other policy in YAML format can be:

```
Policy #2: Data encryption to protect sensitive data
name: Azure MySQL Database Encryption
title: Encryption should be enabled protect sensitive data
  stored in database
posture_type: storage
sub_type: mysql
provider: azure
property:
  encryption-enabled: true
audit:
  severity: critical
  action: report
```

The downstream party can generate other credential criteria for trusted access to the data based on a representation of the other policy, provide to the security assurance facilitator (e.g., providing to the same or different TEE) the data in a form accessible in accordance with the other credential criteria, and obtain result(s) from trusted computation implemented by the security assurance facilitator that also applies the other policy to the data.

Figure 3A:
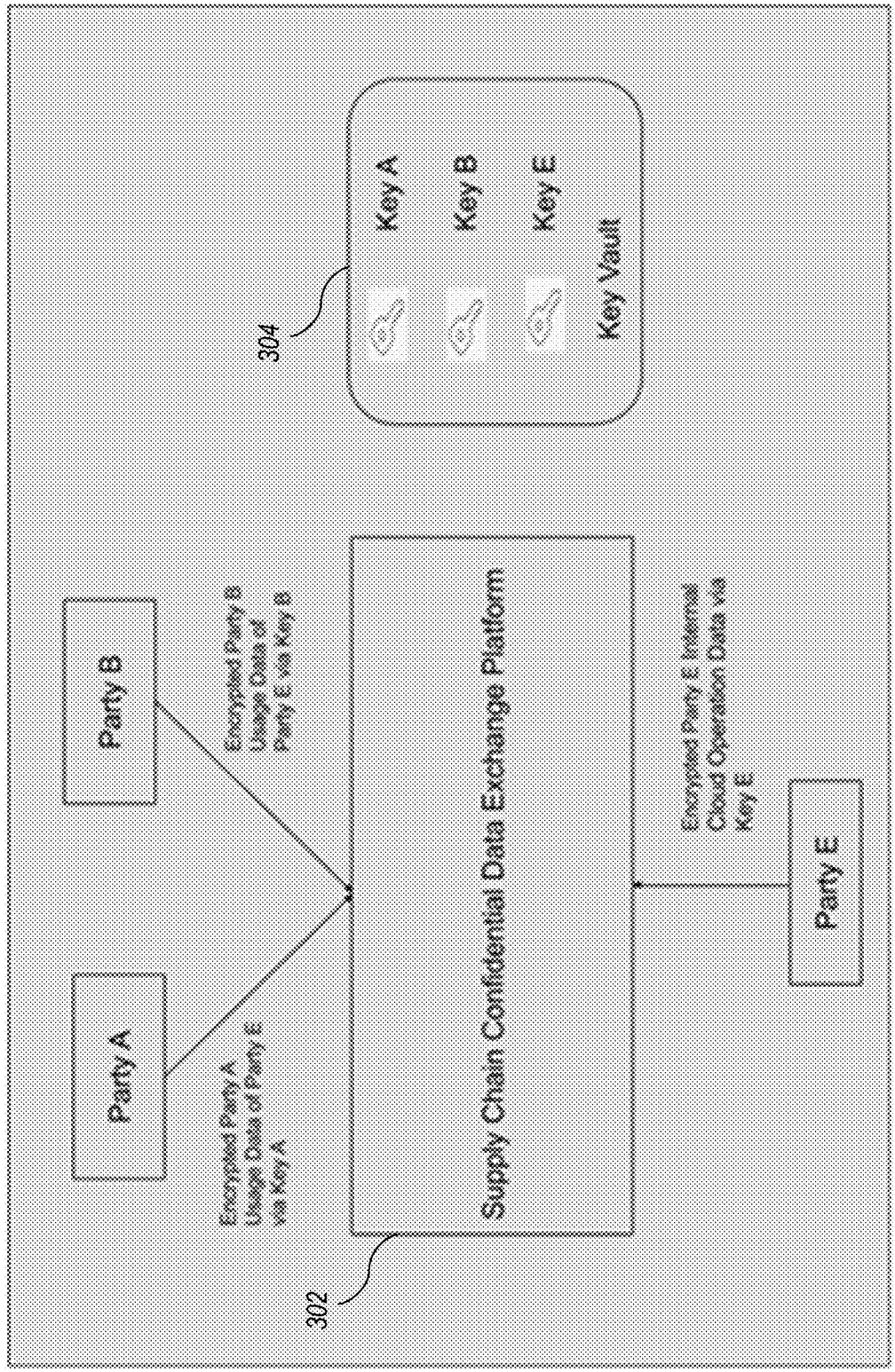
FIGS. 3a-3c illustrate an example implementation of security assurance through trusted data exchange and computation for a cyber supply chain in accordance with some embodiments of the techniques described herein.
Figure 3B:
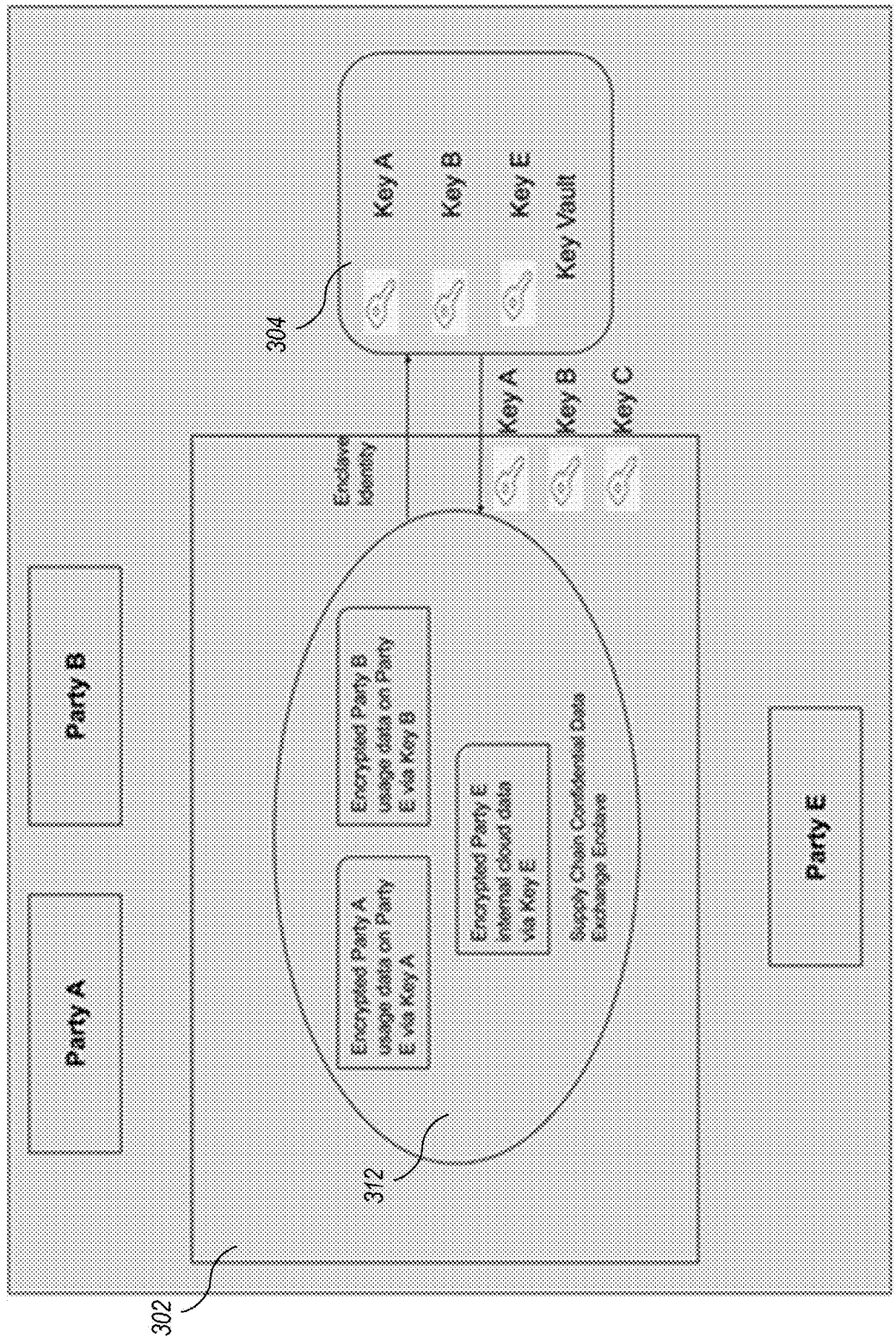
Figure 3C:
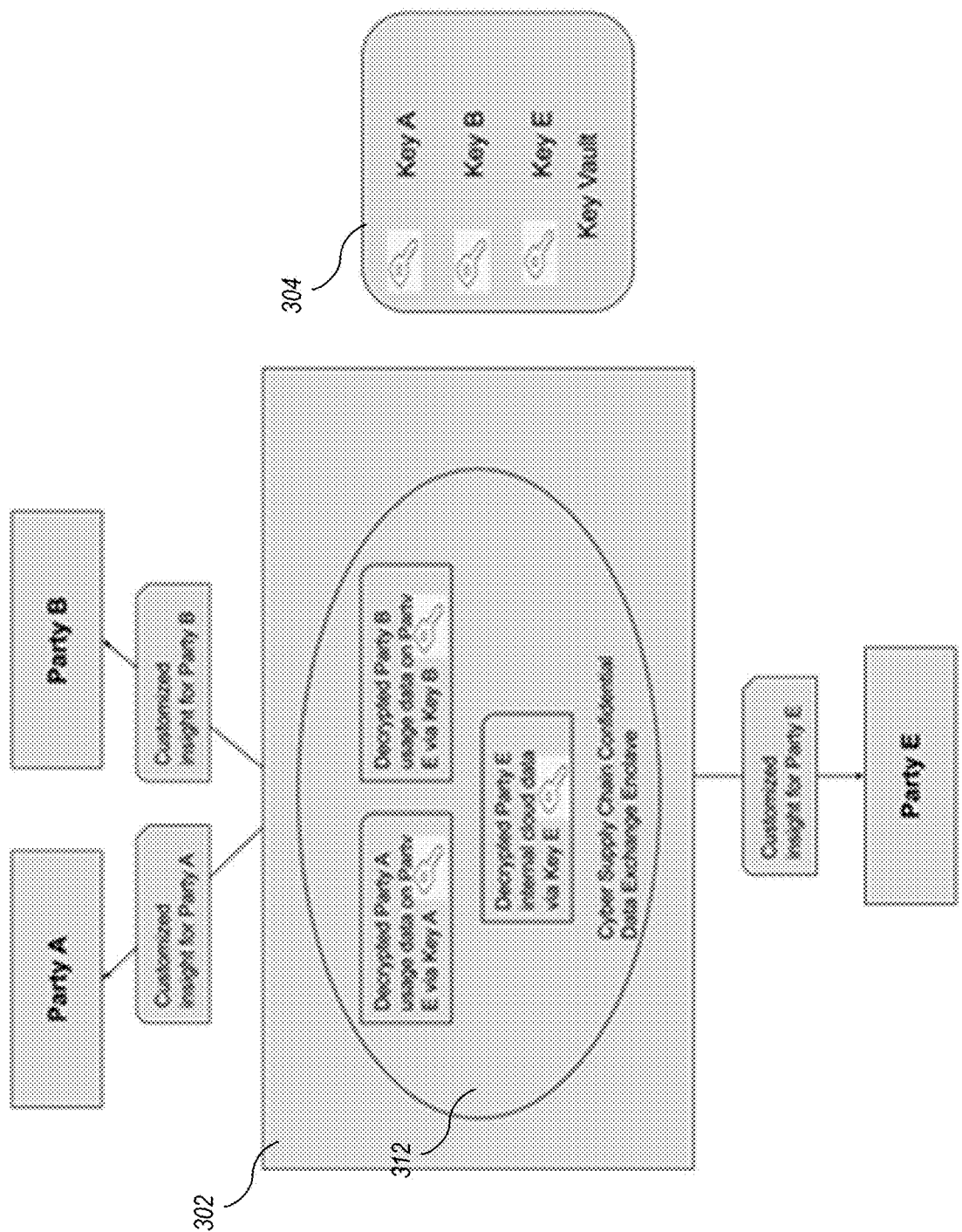

FIGS. 3a-3c illustrate an example implementation of security assurance through trusted data exchange and computation for a cyber supply chain in accordance with some embodiments of the techniques described herein. Illustratively, the example implementation is at least partly based on or supplementing the process 200 described above.

As shown in FIG. 3a, a security assurance facilitator establishes a supply chain confidential data exchange platform 302. Each party in the cyber supply chain can encrypt its own confidential data with its own key (e.g., private key of a respective key pair) before providing the encrypted data to the platform 302. These keys (e.g., public key of the key pair) are then stored in a key vault 304 with each party's own defined credential criteria for accessing or releasing the key. Other parties (e.g., downstream parties, upstream parties, the platform owners) cannot decrypt these encrypted data. In some embodiments, the platform itself (e.g., the services running in TEE) can access the keys to decrypt the data in accordance with applicable credential criteria and then run analysis. However, no other entity, even the platform administrator, has access to the data. This ensures that the data can only be used within the scope defined and agreed to by multiple parties (e.g., in accordance with a policy as described above).

In the example shown, Party A and Party B are upstream parties, and Party E is a downstream party. They can each provide their confidential data to the platform 302, associated with keys A, B, and E, respectively. In some embodiments, the upstream parties can provide their policies to the platform 302 in a same or different manner, because the policies may not be confidential information. The data or policies can be provided to the platform in real time, as requested, on demand, or as triggered by updates. In some embodiments, the platform can access most up-to-date data in real-time from individual parties via a retrieval mechanism (e.g., a data link, pointer, or others) as described above.

As shown in FIG. 3b, after the data is received at the platform 302, the platform 302 can:

create confidential enclave(s) 312 or other instance(s) of TEE, use the enclave(s) 312 to load the platform's predefined components agreed by multi-parties, including, e.g., component(s) that address how upstream nodes audit and enforce downstream nodes in accordance with applicable policies, use the enclave(s) 312 to request access to applicable key(s) in the key vault, e.g., by presenting one or more proper credentials (such as a hash of a policy) that are associated with the applicable policies as part of the enclave identity, and ensure that key vault only releases applicable keys to the enclave(s) 312 once the enclave identity is validated.

As shown in FIG. 3c, after the keys are released into the enclave 312, the enclave 312 can:

use the keys to decrypt the multi-party confidential data and jointly generate insights or other analysis results in accordance with applicable policies, and share the results with the upstream and downstream nodes based on applicable policies (e.g., filtered or otherwise customized for particular parties).

Besides the confidential enclave, confidential workflow, and confidential platform described above, the platform can also define a unified data format for multi-party data exchange and computational result generation. The data format can apply to many aspects including, but not limited to:

upstream usage data, e.g., data describing or otherwise related to the dependencies with downstreams, infrastructure, or service;

downstream operation data, e.g., internal cloud configuration, data operation log, external service points, or the like; and audit insight format, e.g., the format for risk analysis types and results.

Figure 6:
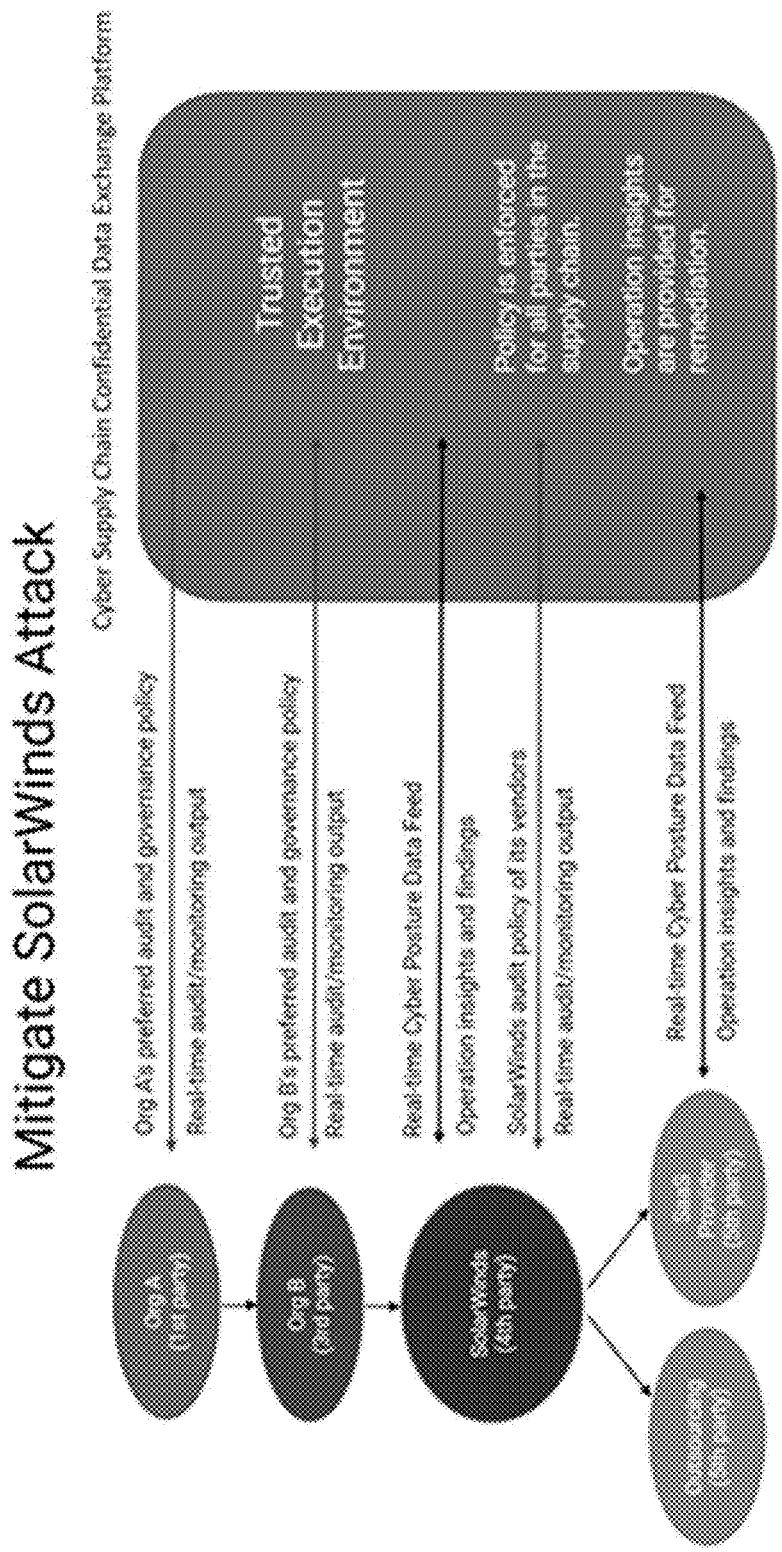
FIG. 6 is diagram illustrating an example of a corresponding operation security enforcement flow in accordance with some embodiments of the techniques described herein.

In this context, FIG. 6 is diagram illustrating an example of a corresponding operation security enforcement flow in accordance with some embodiments of the techniques described herein. As shown, "SolorWinds" is a direct downstream party relative to "Org. B" and a direct upstream party relative to "Outsourcing" and "SaaS Provider." The operation security enforcement is performed in a cyber supply chain including multiple parties forming a hierarchy.

Those skilled in the art will appreciate that the various operations depicted via FIGS. 2-3c, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 4:
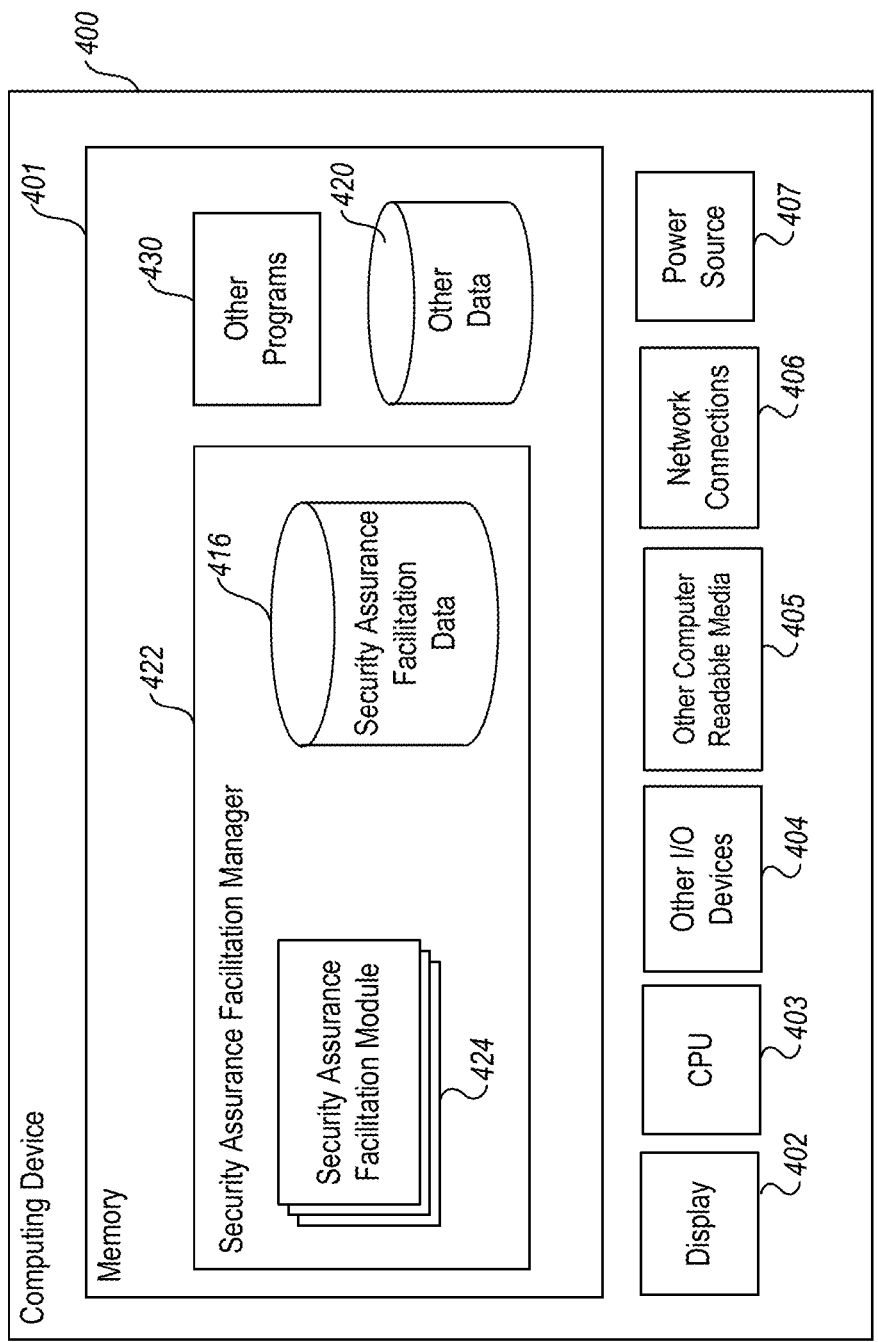
FIG. 4 is a block diagram illustrating elements of an example computing device 400 utilized in accordance with some embodiments of the techniques described herein.

FIG. 4 is a block diagram illustrating elements of an example computing device 400 utilized in accordance with some embodiments of the techniques described herein. Illustratively, the computing device 400 corresponds to a security assurance facilitator 118, an upstream party 128, a downstream party 138, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the security assurance facilitation manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units ("CPU") or other processors 403, Input/Output ("I/O") devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The security assurance facilitation manager 422 is shown residing in memory 401. In other embodiments, some portion of the contents and some, or all, of the components of the security assurance facilitation manager 422 may be stored on and/or transmitted over the other computer-readable media 405. The components of the computing device 400 and security assurance facilitation manager 422 can execute on one or more processors 403 and implement applicable functions described herein. In some embodiments, the security assurance facilitation manager 422 may operate as, be part of, or work in conjunction and/or cooperation with other software applications stored in memory 401 or on various other computing devices. In some embodiments, the security assurance facilitation manager 422 also facilitates communication with peripheral devices via the I/O devices 404, or with another device or system via the network connections 406.

The one or more security assurance facilitation modules 424 is configured to perform actions related, directly or indirectly, to facilitating and managing security assurance of cyber supply chain as described herein. In some embodiments, the security assurance facilitation module(s) 424 stores, retrieves, or otherwise accesses at least some security assurance facilitation-related data on some portion of the security assurance facilitation data storage 416 or other data storage internal or external to the computing device 400. In various embodiments, at least some of the security assurance facilitation modules 424 may be implemented in software or hardware.

Other code or programs 430 (e.g., further data processing modules, communication modules, a Web server, and the like), and potentially other data repositories, such as data repository 420 for storing other data, may also reside in the memory 401, and can execute on one or more processors 403. Of note, one or more of the components in FIG. 4 may or may not be present in any specific implementation. For example, some embodiments may not provide other computer readable media 405 or a display 402.

In some embodiments, the computing device 400 and security assurance facilitation manager 422 include API(s) that provides programmatic access to add, remove, or change one or more functions of the computing device 400. In some embodiments, components/modules of the computing device 400 and security assurance facilitation manager 422 are implemented using standard programming techniques. For example, the security assurance facilitation manager 222 may be implemented as an executable running on the processor(s) 403, along with one or more static or dynamic libraries. In other embodiments, the computing device 400 and security assurance facilitation manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the security assurance facilitation manager 422. In some embodiments, instructions cause the one or more processors 403 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by a security assurance facilitation manager 422 implementation. Also, other functions could be implemented and/or performed by each component/module, and in different orders, and by different components/modules, yet still achieve the functions of the computing device 400 and security assurance facilitation manager 422.

In addition, programming interfaces to the data stored as part of the computing device 400 and security assurance facilitation manager 422, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The security assurance facilitation data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the security assurance facilitation manager 422.

Furthermore, in some embodiments, some or all of the components of the computing device 400 and security assurance facilitation manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. In cases where the present patent application conflicts with an application or other document incorporated herein by reference, the present application controls. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for facilitating security assurance of a cyber supply chain, comprising:
one or more hardware processors; and
memory storing contents that, when executed by the one or more processors, cause the system to perform actions comprising:
obtaining, by a downstream party of a cyber supply chain, information regarding a policy of an upstream party of the cyber supply chain, the policy to be applied to first data of the downstream party, wherein the upstream party has at least one of a data sub-processing dependency, software dependency, infrastructure dependency, or service dependency on the downstream party in accordance with the cyber supply chain;
generating, by the downstream party, credential criteria for trusted access to the first data based, at least in part, on a representation of the policy;
providing, by the downstream party to a security assurance facilitator for the cyber supply chain, the first data in a form accessible in accordance with the credential criteria, without providing the upstream party access to the first data; and obtaining, by the downstream party, a result from trusted computation implemented by the security assurance facilitator that applies the policy to the first data.

2. The system of claim 1, wherein in accordance with the cyber supply chain, the upstream party uses a service provided by the downstream party and the first data includes operation data of the service.

3. The system of claim 1, wherein the information regarding the policy of the upstream party includes at least one of a programing language description, plain English description, or human-readable data-serialization language description.

4. The system of claim 1, wherein the representation of the policy includes a hash of the policy.

5. The system of claim 4, wherein the credential criteria include allowing trusted access to the first data when presented with a credential including the hash of the policy.

6. The system of claim 5, wherein the credential criteria further includes allowing trusted access to the first data when presented with a credential including an identification of the upstream party.

7. The system of claim 1, wherein providing, by the downstream party to the security assurance facilitator for the cyber supply chain, the first data in a form accessible in accordance with the credential criteria includes providing the first data in an encrypted form.

8. The system of claim 7, wherein the first data is decrypt-able using a key that is accessible in accordance with the credential criteria.

9. The system of claim 1, wherein the actions further comprise:

obtaining, by the downstream party, information regarding another policy of another upstream party of the cyber supply chain, the other policy to be applied to second data of the downstream party; and generating, by the downstream party, other credential criteria for trusted access to the second data based, at least in part, on a representation of the other policy.

10. The system of claim 9, wherein the actions further comprise:

providing, by the downstream party to the security assurance facilitator for the cyber supply chain, the second data in a form accessible in accordance with the other credential criteria; and obtaining, by the downstream party, the result from trusted computation implemented by the security assurance facilitator that also applies the other policy to the second data.

11. The system of claim 1, wherein the result is filtered or customized from the trusted computation for the downstream party.

12. The system of claim 1, wherein the trusted computation implemented by the security assurance facilitator includes at least one of monitoring, auditing, or ensuring data security or operation security in the cyber supply chain.

13. A method for facilitating security assurance of a cyber supply chain, comprising:

obtaining, by a downstream party of a cyber supply chain, information regarding a policy of an upstream party of the cyber supply chain, the policy to be applied to target data of the downstream party, wherein the upstream party has at least one of a data sub-processing dependency, software dependency, infrastructure dependency, or service dependency on the downstream party in accordance with the cyber supply chain;

generating, by the downstream party, credential criteria for trusted access to the target data based, at least in part, on a representation of the policy;

providing, by the downstream party to a security assurance facilitator for the cyber supply chain, the target data in a form accessible in accordance with the credential criteria, without providing the upstream party access to the target data; and obtaining, by the downstream party, a result from trusted computation implemented by the security assurance facilitator that applies the policy to the target data.

14. The method of claim 13, wherein in accordance with the cyber supply chain, the upstream party uses a service provided by the downstream party and the target data includes operation data of the service.

15. The method of claim 13, wherein the information regarding the policy of the upstream party includes at least one of a programing language description, plain English description, or human-readable data-serialization language description.

16. The method of claim 13, wherein the representation of the policy includes a hash of the policy.

17. The method of claim 16, wherein the credential criteria include allowing trusted access to the target data when presented with a credential including the hash of the policy.

18. The method of claim 17, wherein the credential criteria further includes allowing trusted access to the target data when presented with a credential including an identification of the upstream party.

19. A non-transitory computer-readable medium storing contents that, when executed by the one or more processors, cause the one or more processors to perform actions comprising:

obtaining, by a downstream party of a cyber supply chain, information regarding a policy of an upstream party of the cyber supply chain, the policy to be applied to target data of the downstream party, wherein the upstream party has at least one of a data sub-processing dependency, software dependency, infrastructure dependency, or service dependency on the downstream party in accordance with the cyber supply chain;

generating, by the downstream party, credential criteria for trusted access to the target data based, at least in part, on a representation of the policy;

providing, by the downstream party to a security assurance facilitator for the cyber supply chain, the target data in a form accessible in accordance with the credential criteria, without providing the upstream party access to the target data; and obtaining, by the downstream party, a result from trusted computation implemented by the security assurance facilitator that applies the policy to the target data.

20. The non-transitory computer-readable medium of claim 19, wherein providing, by the downstream party to the security assurance facilitator for the cyber supply chain, the target data in a form accessible in accordance with the credential criteria includes providing the target data in an encrypted form.

21. The non-transitory computer-readable medium of claim 20, wherein the target data is decrypt-able using a key that is accessible in accordance with the credential criteria.

22. The non-transitory computer-readable medium of claim 19, wherein the actions further comprise:

obtaining, by the downstream party, information regarding another policy of another upstream party of the cyber supply chain, the other policy to be applied to other data of the downstream party; and generating, by the downstream party, other credential criteria for trusted access to the other data based, at least in part, on a representation of the other policy.

\* \* \* \* \*